Patented June 18, 1946

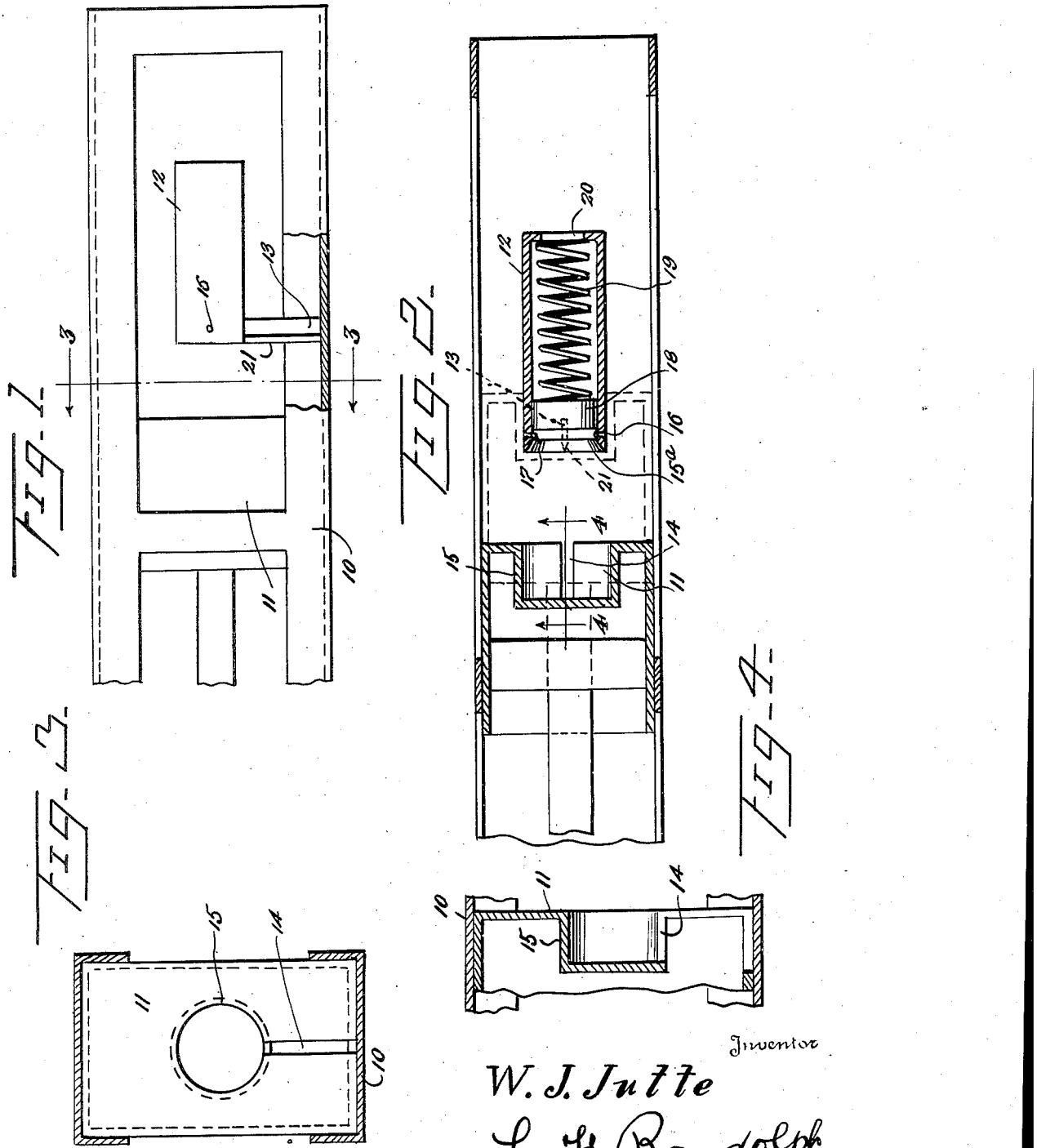

2,402,230

UNITED STATES PATENT OFFICE 2,402,230

HAY BALER

Walter J. Jutte, Fort Recovery, Ohio; Martha Jutte, administratrix of said Walter J. Jutte, deceased Application August 20, 1943, Serial No. 499,403

2 Claims. (Cl. 100—19)

This invention relates to a hay bailing machine.

It is particularly aimed to provide a means which will cut a hole, recess, or bore in one end of a bale of hay, in the process of bailing or compressing it, and particularly aims to provide such a means as will enable the means to be disposed within the bailing chamber of the press.

It is further aimed to provide a novel structure wherein a cylindrical cutting means will engage the hay as it is baled under the action of the plunger, and which plunger is slotted to enable efficient movement of the plunger.

One more object is to provide a novel structure wherein the cut hay or core will be discharged automatically upon release of compression.

Various additional objects and advantages will become apparent from a consideration of the description following taken in connection with the accompanying drawing illustrating an operative embodiment.

In said drawing:

Figure 1 is a view in side elevation, fragmentarily showing a hay bailer equipped with my improvements;

Figure 2 is a central horizontal sectional view through the baler;

Figure 3 is a vertical sectional view taken on the plane of line 3—3 of Figure 1; and Figure 4 is a vertical sectional view taken on the plane of line 4—4 of Figure 2.

Referring specifically to the drawing wherein like reference characters designate like or similar parts, 10 designates the open framework of the baling chamber of a baling press in which a plunger 11 is longitudinally reciprocable. These parts are to be taken as representative and as operable in any suitable manner as is usual or otherwise in hay baling or similar mechanism.

In accordance with my invention I dispose within the baling chamber itself, centrally and with its axis longitudinally disposed, a suitable cylindrical or tubular cutter 12. Such cutter 12 is mounted at the end adjacent the plunger 11 by a blade 13, from the bottom wall of the baling chamber, and in line with the blade 13 the plunger 11 is slotted at 14. Such plunger also is provided with an internal tubular hood 15. The slot 14 enables the plunger to move to receive the blade 13 so that the hood 15 will telescope the tubular cutter 12 as suggested in dotted lines in Figure 2.

At the cutting end cylinder 12 is sharpened or beveled from the center outwardly and may have a separate ring of hardened metal in order to provide a sharp or cutting edge at 15a. The ring may be secured to the tube 12 by a series of rivets at 16 having heads 17 extending interiorly of the tube. Such heads 17 confine a follower or ejector 18, which is slidably mounted in the tube and is sufficiently wide to avoid tilting thereof. The plunger or ejector 18 is slidably mounted, being urged against the rivet heads 17 normally through the expansive action of a coil spring 19 confined within the tube or cylinder 12. The opposite end of such tube or cylinder is open at 20 forming an outlet for the ejection of chaff and the like.

It will be noticed that the edge of the blade 13 facing the plunger 11 is sharpened at 21, preferably from opposite sides.

In the operation of the structure hay is baled into the baling chamber in the usual manner through the compression of the plunger 11. However, with my invention simultaneously with the compression and baling of the hay, due to the fact that the hay is moved or compressed against the edge 15a, a hole, core, or recess is cut into such hay, the cut hay or core being received in the cylinder and moving the ejector 18 toward the opening 20. When compression is released the spring 19 will slide the ejector 18 so that it will eject the core or hay from the tube 12. It will be noted that in addition to cutting the core, recess, or hole in the hay, the same will be split along a transverse line due to the cutting edge at 21.

As a result of the cutting of the hay by the edges 15a and 21 the hay actually will be cut or removed and the straws will be cut transversely, exposing the interior thereof. As a result the hay or equivalent will not expand after provision of the core, hole, or recess; the space provided and the cutting enable air effectively to reach the interior of the bale, greatly to facilitate the curing of the hay or the like.

Various changes may be resorted to provided that they fall within the spirit and scope of the invention.

I claim as my invention:

1. Apparatus of the class described including a plunger operable to compress hay, and a cutter in the path of compression of the hay operable to cut a recess therein as it is being compressed, a blade mounting said cutter, said plunger having a hood to telescope one end of the cutter, and said hood and plunger having a slot to enable the plunger to move relatively to the blade, said cutter being tubular, an ejector slidable in the tube, and spring means urging ejecting movement of the ejector.

2. Apparatus of the class described including a plunger operable to compress hay, and a cutter in the path of compression of the hay operable to cut a recess therein as it is being compressed, a blade mounting said cutter, said plunger having a hood to telescope one end of the cutter, and said hood and plunger having a slot to enable the plunger to move relatively to the blade, said cutter being tubular, an ejector slidable in the tube, and spring means urging ejecting movement of the ejector, said blade being sharpened at its edge adjacent the plunger, said cutter being sharpened at the end adjacent the plunger, and means extending interiorly of the cutter, forming a stop, to prevent outward displacement of the ejector.

WALTER J. JUTTE.